(12) United States Patent
Vieslet

(10) Patent No.: US 10,933,427 B2
(45) Date of Patent: Mar. 2, 2021

(54) METHOD AND FACILITY FOR BIOMASS PREPARATION

(71) Applicant: BioCarbon Industries S.à r.l., Luxembourg (LU)

(72) Inventor: Jean-Paul Vieslet, Liège (BE)

(73) Assignee: BIOCARBON INDUSTRIES S.À R.L., Luxembourg (LU)

( * ) Notice: Subject to any disclaimer, the term of this patent is extended or adjusted under 35 U.S.C. 154(b) by 473 days.

(21) Appl. No.: 15/735,411

(22) PCT Filed: Jun. 10, 2016

(86) PCT No.: PCT/EP2016/063375
§ 371 (c)(1),
(2) Date: Dec. 11, 2017

(87) PCT Pub. No.: WO2016/198653
PCT Pub. Date: Dec. 15, 2016

(65) Prior Publication Data
US 2018/0161781 A1    Jun. 14, 2018

(30) Foreign Application Priority Data

Jun. 11, 2015   (LU) .......................................... 92738

(51) Int. Cl.
*B02C 23/14*  (2006.01)
*B01D 21/26*  (2006.01)
(Continued)

(52) U.S. Cl.
CPC ............ *B02C 23/14* (2013.01); *B01D 21/262* (2013.01); *B02C 7/04* (2013.01); *B02C 23/10* (2013.01);
(Continued)

(58) Field of Classification Search
CPC ......... B02C 23/14; B02C 23/18; B02C 23/10; B02C 7/04; B02C 21/00; B02C 23/08;
(Continued)

(56) References Cited

U.S. PATENT DOCUMENTS 1,335,619 A * 3/1920 Taylor ............................ 19/128
4,552,863 A   11/1985 Fujimori
(Continued)

FOREIGN PATENT DOCUMENTS

CA    2710625        2/2011
CN    101522545 A    9/2009
(Continued)

OTHER PUBLICATIONS

Eija Alakangas, "European Standard (EN 14961) for Wood Chips and Hog Fuel", VTT Technical Research Centre of Finland, P.O. Box 1603, FI-40101 Jyvaskyla, Finland, Published 2011. (Year: 2011).*

(Continued)

*Primary Examiner* — Joseph W Drodge
(74) *Attorney, Agent, or Firm* — Cantor Colburn LLP

(57) ABSTRACT

The present invention relates to a method and facility for preparing lignocellulosic biomass, in particular by means of water extraction and optionally particle-size refinement, for subsequent use particularly in a process of torrefaction, carbonization, pellet production, such as fuel pellets or soil enhancement pellets, or the manufacturing of building materials, or even the preparation of agri-food products, comprising centrifugation (100) of the biomass followed by attrition milling and drying (200).

17 Claims, 4 Drawing Sheets

(51) Int. Cl.
C10L 9/08 (2006.01)
C10L 5/44 (2006.01)
F26B 5/08 (2006.01)
F26B 3/10 (2006.01)
B02C 7/04 (2006.01)
B02C 23/10 (2006.01)
B02C 23/18 (2006.01)
F26B 1/00 (2006.01)

(52) U.S. Cl.
CPC .............. *B02C 23/18* (2013.01); *C10L 5/44* (2013.01); *C10L 9/08* (2013.01); *C10L 9/083* (2013.01); *F26B 1/005* (2013.01); *F26B 3/10* (2013.01); *F26B 5/08* (2013.01); *C10L 2250/06* (2013.01); *C10L 2290/08* (2013.01); *C10L 2290/28* (2013.01); *C10L 2290/54* (2013.01); *Y02E 50/10* (2013.01); *Y02E 50/30* (2013.01)

(58) Field of Classification Search
CPC ......... B02C 23/16; B02C 23/24; B02C 23/26; B01D 21/262; B01D 21/26; Y02E 50/15; Y02E 50/10; Y02E 50/30; C10L 2290/28; C10L 2290/08; C10L 9/083; C10L 9/08; C10L 5/44; C10L 2250/06; C10L 2290/54; F26B 1/00; F26B 1/005; F26B 2200/02; F26B 3/10; F26B 3/00; F26B 5/08; B04B 3/00; B04B 3/02; B04B 5/10; B04B 7/16; B04B 7/18; B04B 15/02; B04B 15/10; B04B 15/12; B04B 2005/0478; B04B 2005/105
USPC ......... 210/173, 175, 182, 184, 360.1, 380.3, 210/511, 770, 774, 781, 787, 806; 494/36, 37; 34/282, 312, 313, 316, 343, 34/380, 386, 387, 526, 549, 58, 59
See application file for complete search history.

(56) References Cited

U.S. PATENT DOCUMENTS

| | | | |
|---|---|---|---|
| 4,589,357 A | | 5/1986 | Lincoln et al. |
| 5,190,672 A | * | 3/1993 | Coenen ............... B09B 3/005 110/215 |
| 5,426,866 A | * | 6/1995 | Rumocki ............... B04B 15/12 34/321 |
| 5,431,702 A | * | 7/1995 | Schulz ............... C02F 11/12 44/552 |
| 5,587,120 A | * | 12/1996 | Vieslet ............... B29B 17/00 264/118 |
| 5,662,810 A | | 9/1997 | Willgohs |
| 5,958,233 A | | 9/1999 | Willgohs |
| 6,129,851 A | * | 10/2000 | Nemedi ............... B04B 3/00 210/373 |
| 8,388,813 B1 | | 3/2013 | Livingston et al. |
| 10,428,288 B2 | * | 10/2019 | Vieslet ............... C10L 9/08 |
| 2006/0010714 A1 | * | 1/2006 | Carin ............... F26B 23/02 34/514 |
| 2006/0112638 A1 | * | 6/2006 | Suyama ............... C10G 31/08 48/197 R |
| 2008/0017086 A1 | * | 1/2008 | Zhang ............... F23G 5/30 110/346 |
| 2008/0283646 A1 | | 11/2008 | Omundsen et al. |
| 2010/0025508 A1 | * | 2/2010 | Didion ............... B02C 17/1825 241/74 |
| 2010/0137126 A1 | * | 6/2010 | Philipp ............... C05D 9/00 502/62 |
| 2010/0287826 A1 | * | 11/2010 | Hoffman ............... C10L 5/363 44/605 |
| 2011/0041393 A1 | * | 2/2011 | Sugita ............... C10L 5/00 44/626 |
| 2012/0211421 A1 | * | 8/2012 | Self ............... B01D 53/62 210/640 |
| 2012/0247165 A1 | * | 10/2012 | Zhong ............... C02F 11/122 71/12 |
| 2012/0280181 A1 | * | 11/2012 | Ruger ............... C10B 53/02 252/373 |
| 2014/0190031 A1 | * | 7/2014 | Wada ............... F26B 17/107 34/61 |
| 2014/0315258 A1 | * | 10/2014 | Nguyen ............... C12P 19/14 435/99 |
| 2014/0352377 A1 | * | 12/2014 | Zhong ............... C02F 11/14 71/8 |
| 2015/0152371 A1 | * | 6/2015 | Gallop ............... B01D 33/11 210/749 |

FOREIGN PATENT DOCUMENTS

| | | |
|---|---|---|
| CN | 104651006 A | 5/2015 |
| DE | 102006061340 B3 | 5/2008 |
| DE | 102010032610 A1 | 2/2012 |
| DE | 102011016003 A1 | 10/2012 |
| EP | 2287278 A2 | 2/2011 |
| FR | 1460736 A | 3/1966 |
| FR | 2449860 A1 | 9/1980 |
| JP | 2006273970 A | 10/2006 |
| KR | 20130034555 A | 4/2013 |
| SU | 1088792 A | 4/1984 |
| WO | 9505087 | 2/1995 |
| WO | 2004072211 A2 | 8/2004 |
| WO | 2011131869 A1 | 10/2011 |
| WO | 2013003615 | 1/2013 |
| WO | 2016198653 A1 | 12/2016 |

OTHER PUBLICATIONS

English Machine Translation to KR20130034555.
English Machine Translation to CN101522545 Abstract.
English Machine Translation to SU1088792.
Temmerman, T., "Les standards europeens pour les biocombustibles solides", Biomass, Bioproducts and Energy Unit, Walloon Agricultural Research Centre, Apr. 1, 2011; 37 pages.
Arden Just et al: "Attrition Dry Milling in Continous and Batch Modes"; Jan. 1, 1997.
Atritor: Broyeurs-Secheurs Series 'A' et 'B', Oct. 5, 2014.
English Machine Translation of DE102006061340 Abstract.
English Machine Translation of DE102010032610 Abstract.
English Machine Translation of DE102011016003 Abstract.
English Machine Translation of JP2006273970 Abstract.
English Machine Translation to FR2449860 Abstract.
English Machine Translation to WO2011131869 Abstract.
International Search Report for Application No. PCT/EP2016/063375.
Siebtechnik: "Centrifuges", Jun. 1, 2014 pp. 5-9 and 16-17.

* cited by examiner

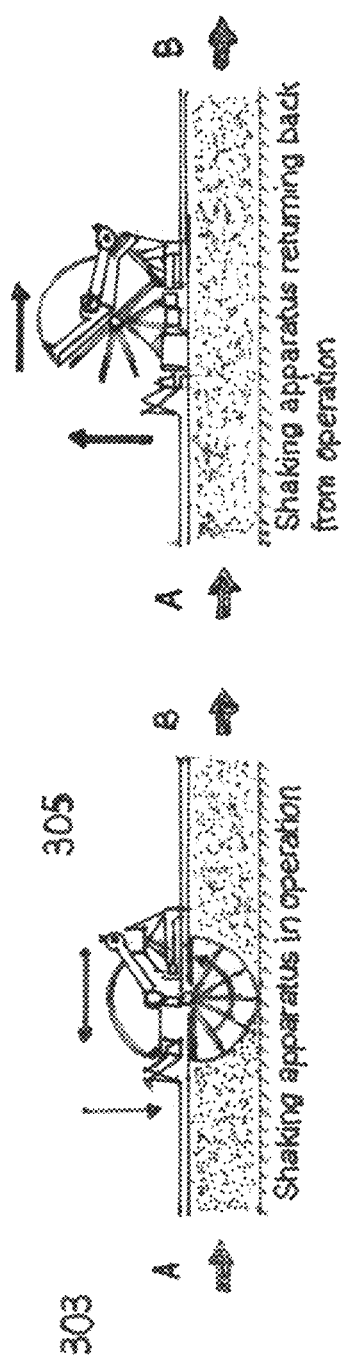

METHOD AND FACILITY FOR BIOMASS PREPARATION

CROSS REFERENCE TO RELATED APPLICATIONS

This application is a National Stage of PCT Application No. PCT/EP2016/063375 filed on Jun. 10, 2016, which claims priority to Luxembourg Patent Application No. 92738 filed on Jun. 11, 2015, the contents each of which are incorporated herein by reference thereto.

TECHNICAL FIELD

The present invention relates to a method for preparing a biomass, in particular by liquid extraction, for a subsequent use, in its current state or after a granulometric refining, in a process such as a roasting process, a carbonization process or a in a process for producing combustible granules, in a process for producing soil improvement granules, or in a process for manufacturing building and/or construction materials, or in a process for preparing agricultural food products, for example. It also concerns a facility for implementing such a method.

BACKGROUND

In the context of the present description, the term «biomass» is used to refer to any organic matter from a lignocellulosic vegetal origin, including in particular wood and residues of lignocellulosic cultures, such as for example straw or sugar cane bagasse.

There are known numerous methods for transforming a lignocellulosic biomass into combustibles. In particular, the biomass roasting consists in heating it to a temperature comprised between 180° C. and 300° C. in a reducing atmosphere. Then, a friable product having an increased LCV (lower calorific value) is obtained. There is also known the transformation of shavings of wood or of other lignocellulosic biomasses into combustible granules. It is also known to manufacture building or construction materials using cellulosic biomass, such as particles boards, OSB boards, hydraulic concrete elements, such as breeze-blocks, etc. In order to be effective, all these methods require an appropriate drying of the biomass as well as an appropriate setting of its granulometry before the subsequent use.

It is known that drying is an operation which consumes a lot of energy. In order to make the biomass treatment processes economically profitable, and in order to reduce the overall energy consumption for the biomass transformation, it is certainly interesting to act on the drying operation. It is also known that the drying effectiveness is related to the granulometry of the particles to dry: the larger the dimension of the particles, the more it is difficult to extract water from. Nonetheless, a too fine granulometry might pose practical problems both in the drying operations and in the subsequent treatment and/or transformation operations.

It is known that the lignocellulosic vegetal organic matters contain water called unbound water, water called bound water and water called constitutive water. The unbound water comes out spontaneously by evaporation; in particular by the action of air movement; nevertheless, it should be noted that drying wood in logs for example requires 1 to 3 years in order to evacuate the unbound water and the bound water down to an acceptable residual moisture content in the wood. It is understood that the bound water is constituted by the fraction of water integrated to the molecular structures of the matter, in particular of the wood, determined essentially by the hemicellulose and the cellulose, including the macropores and the micropores whether it is soft or harder wood. As regards the constitutive water, it can be extracted only though essentially irreversible modifications of the matter. As an indication, for a water content in the range of 50-55 weight % in the biomass, the unbound water corresponds to a fraction ranging up to 25 weight %; the bound water corresponds to 10-35 weight % and the constitutive water corresponds to 0-10 weight %.

In general, the commonly used drying methods mainly involve the use of a hot gas in order to extract the water from the biomass brought to a granulometry which promotes the water extraction. Thus, the document U.S. Pat. No. 4,552,863 describes a method for producing activated carbon granules. The method includes a step of producing a wood powder, a step of drying to a moisture content in the range of 4-5 weight %, a step of granules generation and the carbonization of the granules followed by an activation of the carbonized granules using water vapor at a high temperature. The document U.S. Pat. No. 8,388,813 also describes a biomass treatment method, including roasting or carbonization. The drying step is performed using a rotating drum passed through by a hot gas at a temperature in the range of 315-425° C. on a matter having a granulometry in the range of one centimeter in order to obtain a residual moisture content in the range of 2-4 weight %. The document DE-102011016003 describes a portable facility for biomass roasting, in which wood particles are pneumatically conveyed in a drying cyclone which reduces the moisture from about 50 to about 10 weight %. WO2013/003615 describes a vertical reactor for biomass roasting, in which the crushed biomass is admitted at the upper portion and passes successively on sieves arranged on top of each other. The admitted biomass is dried by hot gas streams passing through the drying stages. Finally, the document CA-2710625 (or EP-2287278) describes a biomass roasting facility including a hot gas drying apparatus which is capable of extracting 85 to 98% of the moisture present in the biomass.

Also, in the processes for producing wood granules, commonly called pellets, it is known to dry the biomass particles before compaction and/or extrusion.

More particularly, the document DE-102010032610 concerns a biomass drying facility, which includes several superimposed conveyor belts, an upper conveyor belt pouring the conveyed matter onto a lower conveyor belt, the conveyor belts being arranged in a closed volume heated by heating elements arranged at the bottom of said volume. The document DE102006061340 also describes a facility for producing pellets, including a drying equipment which, using fans, makes hot gases pass throughout a vertical conveyor screw loaded with biomass.

It will be easily understood that these drying means consume a lot of energy. When the drying gases are at a high temperature, the drying is effective, but such a way of proceeding is accompanied by a risk of ignition of the matter. When the drying gases are at a low temperature, in the range of 140° C. and lower, it is of course possible to use low therms, but we consider that, in general, at least 1.1 MW is needed for each ton of evaporated water.

Finally, the document WO2011/131869 describes a method for manufacturing pellets in which the biomass drying requires a reduced amount of energy and is performed at the same time as the formation of the pastilles, at a reduced temperature of 65 to 95° C. and afterwards in a dehydrator which allows reducing the moisture content of the pellets to about 10%.

The document JP2006/273970 concerns the preparation of a combustible intended for the preparation of clinker. The combustible includes fine carbon and biomass particles. The biomass particles or chips having a moisture content in the range of 25 weight % and a dimension ranging up to 40 mm and the carbon having a moisture content in the range of 9 weight % and particles ranging up to 40 mm with an average diameter in the range of 25 mm are dried and crushed in a mixture. The hot gases at a temperature of 250-500° C. of the clinker production facility are used for drying. The particles are crushed so as to obtain a fraction of particles with a size larger than 90 µm ranging from 20 to 50 weight %, which are separated. A combustible with fine particles is obtained whose inflammability is close to that of carbon powder and which allows recovering the heat energy contained in the biomass and which is injected as a combustible in the clinker rotary furnace, and coarser particles injected in the pre-calcination burner. The crusher may be a roller or ball crusher and the separation is performed on a sieve, for example a vibrating sieve.

The document U.S. Pat. No. 4,589,357 also concerns the preparation of biomass-based combustibles, intended to be burnt in a burner operating by injection of combustible matters in suspension in air. It is desired to reduce the energy expenses for the biomass crushing and there is proposed a bimodal combustible including particles crushed to less than 100 µm which serve in igniting the main fraction of the combustible which includes coarser particles but still smaller than 10 mm. The particles may be crushed in various types of crushers and mention is made in particular to attrition crushers. The document does not describe how the matter is dried in order to obtain the desired humidity rate.

The document U.S. Pat. No. 5,662,810 concerns a method and a device for dehydrating muds, in particular muds derived from alcohol production processes from grains and vegetal fibers. The liquid-solid separation is performed by centrifugation on sieves, or in screw presses. There is produced a filter-cake having 33-34% of dry matter and therefore still more than 65% of water.

The document WO2004/072211 also concerns a biomass-based combustible including finely crushed and dried particles of wood, bark, charcoal or other cellulosic matters, humidified using a vegetal oil or alcohol. If charcoal is incorporated, this is obtained by heating to about 280° C. As regards the cellulosic particles, these are possibly pre-dried and centrifuged afterwards at a temperature such that tars may be extracted from. It is actually a particular form of partial roasting requiring time and energy in order to reach a certain separation and obtain combustible products. Afterwards, the particles are crushed to a particles dimension smaller than 500 µm. They have a low humidity rate in the range of 6 weight %.

In some biomass uses, it may be required to soak it in a solvent, such as water or other, and afterwards dry it and/or extract the desired substances from.

BRIEF SUMMARY

It arises from the foregoing that the step of extracting liquid and more particularly water deserves special attention. The present invention aims at improving the water extraction, more particularly the biomass drying by reducing the energy consumption necessary to obtain an acceptable residual liquid content, more particularly in the range of 2 to 12 weight % in the biomass entering in the subsequent forming and/or transformation step, such as the production of granules for various uses, such as combustible granules or soil improvement granules, the roasting or carbonization, the production of building materials or the production of agricultural food products.

More particularly, the present invention aims at providing an improved preparation method, in particular for mechanical extraction of water from the lignocellulosic biomass for its use in various applications, such as building materials, particles boards, its forming into granules for various uses or its transformation, in particular by roasting or its transformation into charcoal, or the preparation of nutritional supplements or other agricultural food products.

It also aims at providing a facility for implementing the improved method.

According to a first aspect, the present invention provides a method for preparing a lignocellulosic biomass, in particular by water extraction, for a subsequent use, including a centrifugation of the biomass followed by an attrition crushing-drying.

It is understood that the biomass thus supplied may have undergone other treatments, such as a shredding in order to bring the biomass to a desired dimension, optimum for the method of the invention, and/or a heating at an adequate temperature. The biomass may further have been subjected to sprinkling and/or immersion in a fluid, such as a solvent or water at an adequate temperature in order to promote the opening of the pores of the matter. This pre-treatment may facilitate the liquid extraction in the method of the invention.

The centrifugation is well known as such but has not found application for the extraction of water from solid biomass, more particularly for biomass drying. The known applications are restricted to separating the biomass from the water holding it in suspension, such as muds drying. Another known application of the cellulosic biomass centrifugation consists in extracting tars from at a substantially high temperature. It has appeared that this centrifugation technique applied on the biomass, possibly rinsed or treated beforehand with water or any other fluid, allows extracting the water from in an economical manner using a reduced energy expense.

Advantageously, the centrifugation is performed on a biomass with a substantially coarse granulometry, in particular in a screen wringer rotating at a speed generating a centrifugal force greater than 1000 G, advantageously greater than 1200 G, preferably greater than 1500 G, quite particularly greater than 2500 G. It is understood that the upper limit is dictated by mechanical construction considerations and based on economic considerations. In practice, it is quite possible to reach forces in this range at acceptable prices. Preferably, the centrifugation is performed in a horizontal-axis screen wringer, preferably with a trunconical sieve, continuously supplied with a biomass flow, in particular a fluid flow, for example air, charged with biomass, possibly assisted by a supply screw, at the small-diameter side, the biomass being conveyed along the sieve by a screw and the moisture-reduced biomass being recovered at the large-diameter side. This consists of a Conturbex-type (commercial name of Siebtechnik) centrifuge known in particular for the physical separation of solids and liquids in the chemical, food industries or other, but not usually used for the extraction of liquid and in particular water, more particularly for biomass drying. Conveying along the ideally trunconical sieve results in subjecting the biomass to increasing centrifugal forces. It is understood that the choice of the leakage angle of the trunconical sieve allows adapting the centrifugation of the biomass to the desired results. Advantageously, the rotational speed of the conveyor screw is different from the rotational speed of the sieve and is adjustable so as to set the stay time of the matter in the centrifuge accordingly, thereby allowing pushing the liquid extraction more or less further. Advantageously, the biomass is conveyed by a hot air stream at a temperature lower than 200° C., preferably lower than 140° C., more particularly comprised between the ambient temperature and 95° C., quite particularly between 40 and 95° C., and possibly assisted by a supply screw. It has been observed that a wringing step in such an equipment, allows obtaining a reduction of the moisture content of the biomass by 8 to 20 weight %, to bring it down to less than 50 weight %, advantageously less than 45 weight %, preferably less than 40, 35 and even 30 weight %; and this using a reduced energy expense. It should be noted that it was unexpected to obtain not only a solid-liquid separation, but also an extraction of such a considerable portion of the bound water using an essentially mechanical treatment at a reduced temperature. At these temperatures, the formation and/or the extraction of tars and other liquors is prevented. It is thought that this surprising result may result from the fact that during the passage from the ambient temperature in the hot conveying gases, the pores of the relatively coarse particles of biomass, and in particular of wood, are dilated and thus release a significant amount of bound water by wringing. Considering the advantageous energy balance of this operation practiced on biomass with a substantially coarse granulometry, it is advantageous to push the wringing further yet without affecting the mechanical and economic reliability of the operation.

Moreover, it has been observed that the dimension of the particles may be substantially coarse yet without significantly affecting the wringing result in a negative manner. In particular, a centrifuge of the above-described type offers flexibility in setting the centrifugal force and/or the stay time such that it can treat biomasses having a wide range of different granulometries. In practice, essentially for economic and availability reasons, we operate with shredded chips-type biomass particles. The chips may have a maximum dimension ranging up to 100 mm or 63 mm with a thickness of 0.5 to 13 mm, depending on the dimensions of the used machine; we will herein consider in particular the dimensions of the conveyor screw. Hence, screenings ranging from P16 to P100 in compliance with the standard EN14961 may be suitable without difficulty. Nonetheless, the choice of the granulometry of the biomass supplied into the method of the invention depends on the desired granulometry at the output of the method, for the subsequent forming and/or transformation steps.

Afterwards, the biomass with the reduced water content is subjected to an attrition crushing-drying operation. In turn, the attrition crushing-drying reduces the size of the biomass particles admitted in the attrition crushing-drying step, and furthermore heat-soaks the biomass by extraction of liquid and in particular water, in particular subsequently to the internal warm-up generated by the crushing and the attrition. Advantageously, the crushing-drying is performed in an Attritor-type (commercial name) attrition crusher including a fixed flat drum supporting the fixed crushing members on its two sidewalls and a disc rotating in said drum, thus defining on either side a first cage and a second cage, and supporting the movable crushing member, the disc rotating at speeds in the range of 500 to 3500 rpm, preferably in the range of 700 to 1900 rpm. This type of attrition crusher is known, in particular in carbon crushing and in the mineral and chemical industry. The matter is brought by a fluid flow, for example a gas or air, in the proximity of the axis of rotation, into the first cage, also called crumbling cage, coarsely crushed in the latter and conveyed toward the periphery of the drum so as to circumvent the disc and pass into the second cage, before being finally expelled from the second cage by the fluid flow in the proximity of the axis of rotation. Advantageously, the outlet is equipped with a filtering diaphragm which lets the particles having the desired diameter pass and keeps the coarser particles in the second cage which will be crushed therein until reaching the desired dimensions. In the second cage, the conveying fluid flow tends to bring the products toward the discharge outlet in the proximity of the axis, and the centrifugal forces induced by the rotation of the disc provided with crushing pins tend to push the coarse particles back toward the periphery of the drum. These antagonist forces create a product suspension in the conveying gas which is strongly stirred by the pins. Thus, the product is crushed in particular by friction of the particles against each other. As regards the finer particles, the drive force due to the fluid flow becomes dominant and they are driven toward the outlet. This operation can treat a wide variety of particles dimensions, in particular coarsely shredded biomasses, depending in particular on the dimension of the upstream equipment.

Indeed, the attrition crushing is known, but, to date, it has not found application for drying solid cellulosic biomasses with substantial dimensions ranging up to about 100 mm by extraction of water from the matter itself. The known applications relate to the treatment of biomass muds, digestates and distillates aiming at separating the solid matters from the liquids.

When the matter is loaded into the attrition crusher-dryer using a hot gas stream, the drying yield resulting from the attrition is improved further. According to one embodiment, it is possible to use hot air to this end, preferably at a low temperature, in particular a temperature lower than 200° C., preferably lower than 145° C., more particularly comprised between the ambient temperature and 95° C., quite particularly between 40 and 95° C. This embodiment allows using low therms and is substantially economic. According to another embodiment, it is possible to use combustion gases, in particular at temperatures in the range of 250 to 600° C. and therefore at very small rates and even in the absence of oxygen. This embodiment has the advantage of recovering the energy from the fumes and constituting a step of filtering the latter. Advantageously, the attrition crushing-drying step reduces the moisture content of the biomass by 8 to 30 weight %, preferably by 10 to 25 weight %, more particularly by 12 to 22 weight %.

As already mentioned, the effectiveness of the dehydration depends to a large extent on the size of the particles, in other words on the granulometry. As regards the size of the particles, we are of course bound by the requirements of the subsequent steps of the method.

According to a preferred embodiment, the method of the invention further includes a prior drying step using a hot gas at a low temperature, in particular lower than 200° C., preferably lower than 140° C., between the centrifugation and the attrition crushing-drying. Advantageously, this low-temperature drying step is designed to reduce the moisture content by 10 to 20 weight %.

This drying step may be performed in various equipments. According to a first variant, it is possible to dry the biomass on an active floor, preferably automated. By active floor, is meant a bottom floor allowing the accumulation of the biomass over a height of a few hundreds of millimeters to about 3200 mm, the biomass heap being mechanically shook or intermingled in order to make the air penetrate therein which air is capable of driving a significant amount of water. We have obtained good results with layers of matters ranging up to 3000 mm. Preferably, this air is at a temperature slightly higher than the ambient temperature. The intermingling or shaking may be performed using a rotary blade roll passing into the matter heap. This step allows reducing the water content by 5 to 20 weight %, preferably by 10 to 15 weight %.

According to another variant, it is possible to provide for an intermediate drying step in a facility with superimposed conveyor belts passed through by an ascending hot air stream. For this kind of facilities, two conveyor belts or more are superimposed and an upper belt pours the biomass onto a lower belt and the last belt discharges the biomass into the downstream equipment. A hot air stream is sent from the bottom, passes through the lower conveyor belt and the biomass heap deposited thereon and afterwards the upper belt and the biomass deposited thereon etc. and brings with it the water contained in the latter. Advantageously, the air is at a temperature lower than 200° C., preferably lower than 140° C., more particularly comprised between the ambient temperature and 95° C., quite particularly between 85 and 95° C. and therefore uses low therms.

According to yet another variant of the method of the invention, it is possible to perform this intermediate drying in boxes with moving bottoms. These consist of boxes including a perforated bottom, made for example of an expanded or micro-perforated metal, constituted by various longitudinal elements each being displaced independently according to a longitudinal reciprocating movement, thus driving the biomass into a longitudinal movement. The perforated longitudinal elements are passed through by a hot air stream with low therms which passes through the accumulated biomass so as to dry it.

Finally, and where needed, it is possible to further provide for a supplemental drying step by a hot gas at a low temperature, in particular lower than 200° C., preferably lower than 140° C., more particularly comprised between the ambient temperature and 95° C., quite particularly between 40 and 95° C., in order to bring the biomass to the desired humidity rate. This step also enables a dosage of the supply of the next processes. Preferably, this step will be performed in a fluidized-bed device, preferably an oscillo-vibratory fluidized-bed device.

As already mentioned, the method of the invention concerns the preparation of a biomass, in particular by water extraction, for a subsequent use, in its current state or after a granulometric refining. The subsequent use may consist of a transformation process, or still a forming process, or still a process for manufacturing building and/or construction materials or agricultural food products. By forming, is meant in particular the forming of combustible granules or sticks according to known techniques, such as for example compaction, die extrusion or others, but also the forming of granules for other specific applications. By transformation, is meant in particular the roasting or carbonization, for example for the production of charcoal. For the production of particles boards or building materials, such as breezeblocks, the biomass is mixed with a binder and implemented according to known methods. In the case of the production of agricultural food products, the fibrous biomasses are mixed with other components and/or food and the mixture is possibly formed, in particular in the form of granules.

It has been observed that the method of the invention, and quite particularly the preparation method including a centrifugation followed by a crushing-drying, allows obtaining a biomass with a desired humidity rate while spending less energy than the conventional processes. Starting from a biomass with a substantially coarse size and with a humidity rate of about 55 weight %, it is possible to obtain a biomass having a granulometry in the range of one millimeter and a humidity rate lower than 15 weight %, lower than 8 weight % and even lower than 4 or 3 weight % while consuming only but small amounts of energy, that is to say amounts substantially lower than these commonly used by the conventional drying processes. There have been observed overall energy savings in the range of 20 to 60%, that is to say for example over the entire drying and crushing process. It is understood that for a use of the biomass thus treated in a forming operation, such as a die granulation, it may be advantageous to maintain a higher moisture content in the range of 10 to 12 weight %, bearing in mind that a fluidity of the matter adapted to the granulation and/or agglomeration process should be maintained and that the frictions in particular in the die also generate a rise of temperature which may be used for water extraction.

According to another aspect, the invention concerns a facility for preparing a lignocellulosic biomass, in particular by extraction of liquid and in particular water, and possibly by granulometric refining, for a subsequent use in particular in a roasting, carbonization and/or forming process, in particular for the production of combustible granules or soil improvement granules, a process for manufacturing building and construction materials, or a process for preparing agricultural food products, including at least a biomass shredder with a desired granulometry and a screen wringer and an attrition crusher-dryer.

According to another aspect of the invention, this also concerns a facility for preparing a lignocellulosic biomass, in particular by water extraction, and granulometric refining, for a subsequent use in particular in a roasting, carbonization and/or forming process, in particular for the production of combustible granules or soil improvement granules, or still a process for manufacturing building and construction materials, or a process for preparing agricultural food products, including at least one screen wringer and an attrition crusher-dryer.

Advantageously, the screen wringer rotates at a rotational speed such that it produces a centrifugal force greater than 1000 G, advantageously greater than 1200 G, preferably greater than 1500 G, quite particularly greater than 2500 G. Advantageously, it consists of a Conturbex-type wringer already described hereinabove which includes a sieve, preferably a horizontal-axis trunconical sieve, continuously supplied with biomass, preferably by a fluid flow, for example air, charged with biomass, at the small-diameter side, the moisture-reduced biomass being recovered at the large-diameter side after having been conveyed along the inner wall of the sieve by a screw. The biomass may be conveyed by a conveying air stream at a temperature lower than 200° C., preferably lower than 140° C., more particularly comprised between the ambient temperature and 95° C., quite particularly between 40 and 95° C. Advantageously, the centrifugation is followed by an attrition drying-crushing.

Advantageously, the attrition crusher-dryer is an Attritor-type crusher-dryer as described hereinabove including a fixed flat drum supporting the fixed crushing members on its two sidewalls, a disc rotating in said drum, thus defining on either side a first cage called crumbling cage and a second cage, and supporting the movable crushing members, the disc rotating at speeds in the range of 500 to 3500 rpm, preferably in the range of 700 to 1900 rpm, and a conduit for supplying the biomass in suspension in a preferably hot gas stream, in the proximity of the axis of rotation, into the first cage, and a conduit for discharging the matter in suspension in a gas stream, from the second cage in the proximity of the axis of rotation.

The facility of the invention may further include, between the centrifugation and the attrition crushing-drying, an intermediate drying apparatus using a hot gas at a low temperature, in particular lower than 200° C., preferably lower than 140° C., in particular at a temperature comprised between the ambient temperature and 95° C. Various alternatives to such an equipment are described hereinabove.

Finally, the facility of the invention may further include downstream of the attrition crusher-dryer, a supplemental drying apparatus by a hot gas at a low temperature, in particular lower than 200° C., more particularly lower than 140° C., in particular comprised between the ambient temperature and 95° C., advantageously in the range of 40 to 95° C. Advantageously, this supplemental drying apparatus may consist of a fluidized-bed drying apparatus, more particularly a known apparatus with an oscillo-vibratory micro-perforated tray.

BRIEF DESCRIPTION OF THE DRAWINGS

The present invention is described in more detail hereinbelow, based on the drawings in which:

FIG. 4 is a schematic representation of a «lane-trench» type active floor.

DETAILED DESCRIPTION

Figure 1:
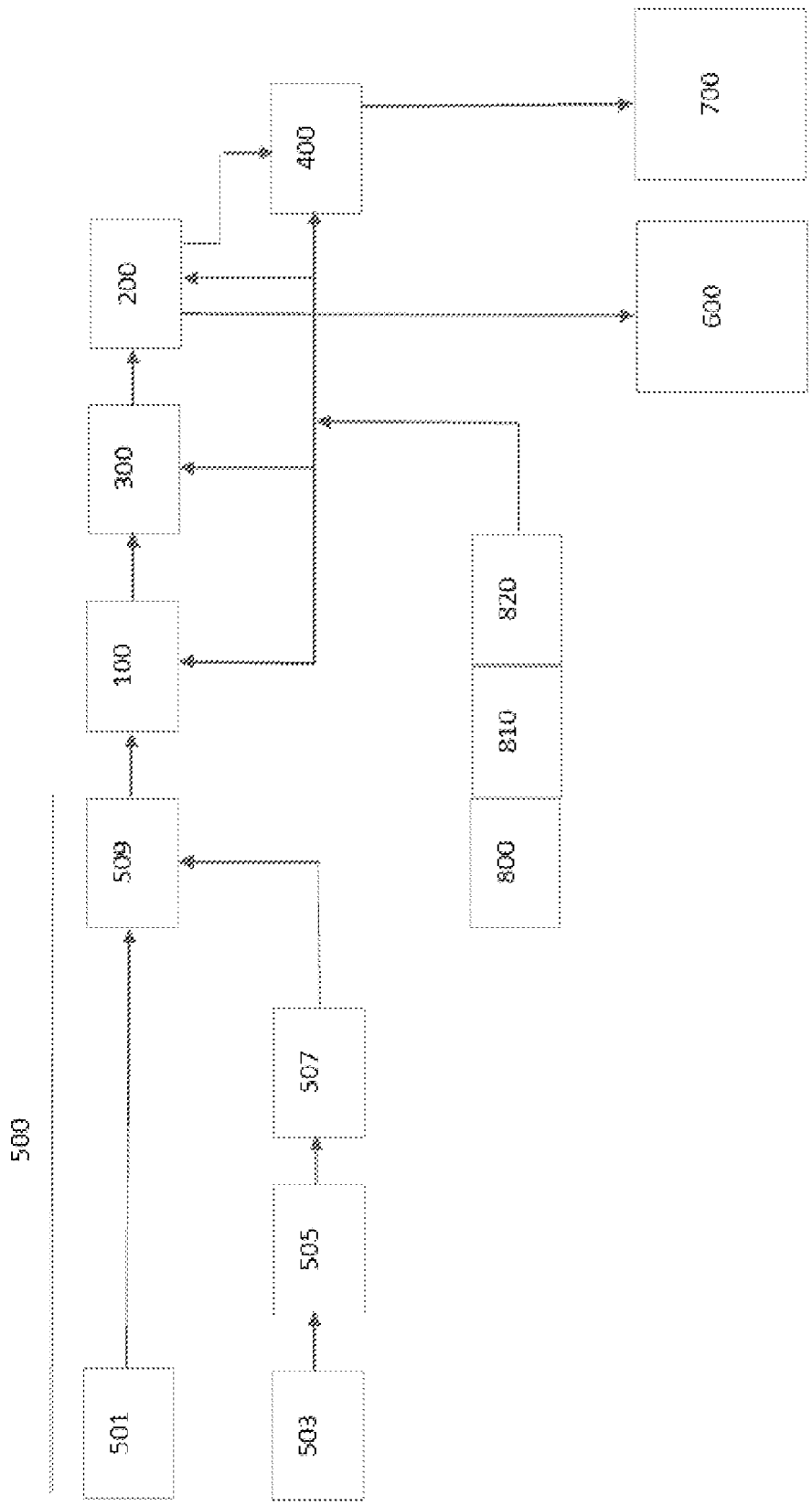
FIG. 1 represents a block diagram of a facility according to the invention.

Referring to FIG. 1, the block diagram shows the various steps for preparing biomass, in particular wood boards, also called shavings, shredded wood or wood chips, by centrifugation 100 and attrition-crushing 200 before introduction in the forming of combustible granules 600 (commonly called «pellets») or in the transformation by roasting or carbonization for the production of bio-carbon or charcoal 700. Advantageously, the represented biomass preparation method further includes an intermediate drying step 300 and a supplemental drying step 400. It is understood that in order to be able to generate a product with the most constant possible quality, the initial matters should be collected, stored, shredded and mixed, as most uniformly as possible—and even collectively at 500. Preferably, the storage is performed so as to avoid any biological fermentation. In the example, the lignocellulosic matter is wood, coming in particular from northern regions. It is also possible to transform other lignocellulosic matters, such as straw or sugar cane bagasse. Advantageously, the wood may be shredded at the cutting site, and then transported and stored in the form of forestry chips 501. It is also possible to transport and afterwards store the wood in the form of logs or ridges; it is then possible to bark 505 the ridges and/or to shred them into chips with desired dimensions on site—see 507, possibly with intermediate buffer storages. The biomasses of various origins, such as different wood species may be mixed 509 afterwards before being treated according to the invention. To this end, it is possible to use known processes and equipment for this purpose.

As will be seen hereinbelow, the biomass is conveyed into the facility according to the invention using a hot gas, in particular air, at a low temperature, in particular lower than 140° C., more particularly lower than 95° C.; which allows using low therms. Hence, a thermal block 800 should be provided for heating the air, equipped with exchangers 810 for the recovery of calories from the evacuated air and with an appropriate management equipment 820. The hot air is distributed in an appropriate manner via adequate conduits 833, 835, 837 and 839 toward the various steps of the method of the invention.

Figure 2:
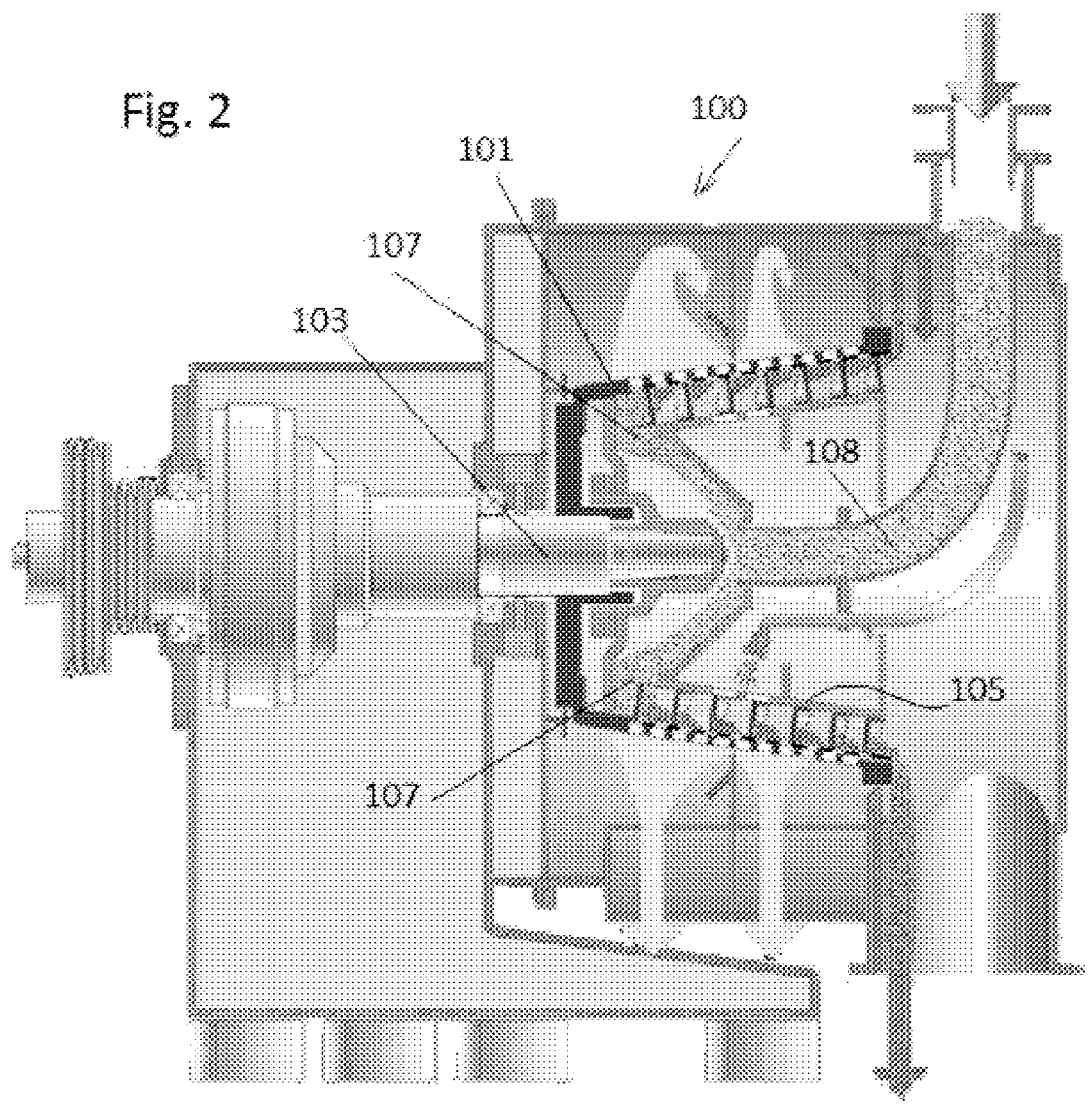
FIG. 2 is a longitudinal section throughout a trunconical screen wringer axially supplied in a continuous manner.
Figure 3:
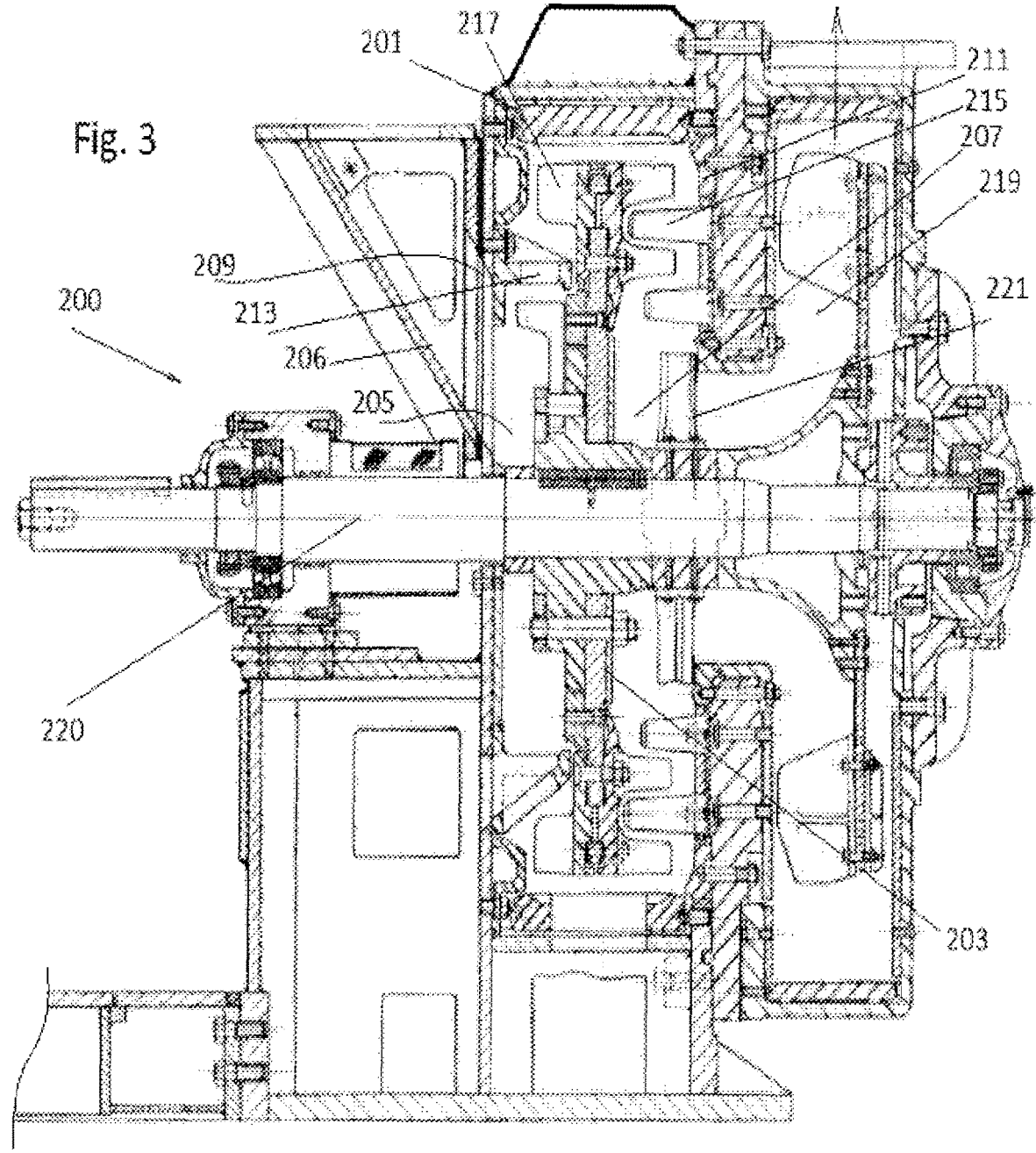
FIG. 3 is a longitudinal section throughout an attrition crusher used in the context of the invention.

According to the invention, the centrifugation is advantageously performed in a Conturbex-type (commercial name of Siebtechnik) centrifuge a schematic axial section of which is shown in FIG. 2. A trunconical sieve 101 is shown cantilevered on an axis of rotation 103 which can rotate at speeds generating centrifugal forces in the range of 1800 to 2000 G. The axis of rotation also carries a trunconical screw 105 which rotates at a speed lower than that of the sieve 101. At the small-diameter side, the trunconical screw 105 includes passage openings 107. The biomass in suspension in a hot air stream at a low temperature, that is to say lower than 140° C., advantageously comprised between 40 and 95° C., is supplied axially via a conduit 109 which discharges the biomass at the small-diameter side of the trunconical screw 105. The biomass is sent by the centrifugal force throughout the openings 107 on the sieve 101. The screw 105 conveys it along the inner wall of the sieve 101 before discharging it at the large-diameter side. The centrifugal force applied to the biomass throughout its pathway along the sieve 101 extracts water from the solid particles which may be evacuated afterwards, possibly after having recovered therefrom the calories and/or specific fluids which are economically interesting to recover. The hot conveying air may be recycled or may pass into an exchanger in order to recover the contained calories for a reuse in the process of the invention or it may be sent in any of the equipments of the preparation line. This machine is known per se, but has not been used for the purposes herein intended. It is robust, allows a considerable flow rate well appropriate to the purposes of the process of the invention without any modification except routine adaptations, and requires little servicing. The setting of the speed of the screw independently of the speed of the sieve allows flexibility in the setting of the dehydration by setting the stay time of the biomass within the centrifuge. It has been observed that the centrifugation 100 may thus extract 8 to 20 weight % of the water contained in the wood particles, all the unbound water but also a significant portion of the bound water. Depending on the settings, the humidity rate and the dimensions of the wood particles sent into the centrifuge, possibly after an adequate pre-treatment, it is possible to bring a charge which contains from 50 to 65 weight % of water down to a water content in the range of 25 to 45 weight %.

It is known the water extraction capacity depends to a large extent on the granulometry and on the porosity. The granulometry of the entering biomass particles is chosen according to the economic shredding data and to the requirements regarding the final use of said biomass thus prepared. Considering the relatively low operating costs of this first centrifugation step, it is advantageous to push the dehydration further on relatively coarse particles. In the embodiment, we have operated with shredded chips-type particles compliant with the papermaking standards, see also the standard EN 14961. More particularly, we have used wood boards having a length smaller than 63 mm and a thickness in the range of one centimeter. A finer shredding (namely resulting in particles having almost the same thickness but a length smaller than 45 mm) improves the dehydration in the centrifuge. Coarser particles will require a longer stay time, for the same final granulometric result. Though centrifugation is normally used to separate a reduced amount of solids from a large amount of liquid, we use centrifugation herein to separate a reduced amount of liquid from a large amount of solids.

The attrition crushing is known per se but, to date, still appears not to have been practiced neither on lignocellulosic biomasses neither for rather coarse granulometries which may range up to more than 80 mm, knowing that it is generally used for fine solids reduction. It has the advantage of crushing the biomass particles down to the desired granulometry by generating internal heat by friction of the particles on one another. Thus, we can heat-soak the matter particles in order to extract a substantial amount of bound and constitutive water driven and evacuated by a low-temperature hot air stream. According to the embodiment retained in the example, the attrition-crushing apparatus consists of an Attritor 20A type attrition crusher, including a relatively flat fixed cylinder 201 and a coaxial rotating disc 203. The rotating disc 203 divides the volume of the fixed cylinder 201 into two cages 205, 207, on either side of the disc 203. The sidewalls 209 and 211 of the cylinder 201 include pins called fixed pins 213 and 215 and the rotating disc includes, at both sides, pins called movable pins 217. The biomass is supplied in the form of a hot gas stream conveying the biomass in suspension, in a conduit 206, at one side of the fixed cylinder 201 via the sidewall 209, in the proximity of the central axis 220. It is driven by the gas stream and the centrifugal force generated by the rotating disc 203 and its pins 217 toward the periphery of the fixed cylinder 201. During the passage into the first cage 205, the biomass is crushed between the fixed pins 213 and the movable pins 217. Afterwards, it is brought to circumvent the rotating disc 203 and to pass into the cage 207 before being evacuated afterwards by the outlet filtering diaphragm 221, via the conduit 219. Said filtering diaphragm lets the particles having the desired dimension pass, but the very coarse particles are driven by the centrifugal force into a particularly agitated gas stream at the location of the pins 211, 217 which allows an attrition crushing of the particles. Finally, the properly crushed particles are brought by the hot stream throughout the sieve 221. It has been observed that, in this step, it is quite possible to extract from 8 to 30 weight % of moisture in an economically profitable manner.

In the described embodiment, the conveying gas is hot air having a temperature difference with the ambient temperature, comprised between 40 and 95° C., which hot air is available in the facility since it is also used for conveying the biomass into the centrifuge. It is understood that the attrition drying crushing operation may operate with air at the ambient temperature. Advantageously, it is also possible to convey the biomass in a combustion gas stream of the boiler (with a small oxygen content or in the absence of oxygen) serving to generate the hot air for example. Those skilled in the art may combine the various variants depending on the requirements of the process, on the available budget and on the environmental and economical requirements of the application.

According to the method of the example, an intermediate drying step 300 is provided between the centrifugation 100 and the attrition-crushing 200. In the embodiment, this step is performed on an automated active floor. This device consists of a floor 301 on which is laid down a heap of matter 303 over a height of about 3000 mm. A shaking device 305 is displaced along the heap of matter 303 in order to turn it over, shake it and aerate it. This aeration of the laying biomass allows evacuating the contained water, and this at the ambient temperature or at a higher temperature, preferably slightly higher, namely in the range of 40 to 95° C. The shaking device 305 may include a blade roll 307 which rotates within the matter in order to turn it over. Of course, other shaking devices may find application in this step. The effectiveness of the process depends in part on the evacuation of the moisture-charged air; it is therefore essential to provide for an adequate ventilation of the location of this active floor.

An intermediate drying may be advantageous, in particular if the biomass at the outlet of the attrition crusher must have a very low humidity rate, in the range of a few percent. This intermediate drying may then be sized according to the desired result at the outlet of the crusher 200.

At the outlet of the attrition crushing step, the matter may already be suited for the subsequent transformation. In particular, when it is desired to produce combustible granules (pellets), it is possible to transfer the biomass obtained at the outlet of the attrition crushing step directly to the transformation process, in particular by compaction.

In some applications, and in particular when it is desired to roast or carbonize the biomass, for example for the production of bio-carbon, it is preferable to push the drying further. In the embodiment, there is provided a supplemental drying step, for example via a fluidized-bed 400, in order to obtain an optimum humidity rate. Such a device is known per se and does not require any particular description. It should just be noted that the suspension air is advantageously at a temperature lower than 140° C., preferably in the range of 40 to 95° C.

The overall (electrical and thermal) energy necessary for this biomass preparation is reduced at least by about 50% in comparison with the conventional processes.

As already mentioned, it is also possible to convey the lignocellulosic biomass using combustion gases into the attrition crusher. These gases are quite hot and may therefore facilitate the drying. The risk of auto-ignition and of the formation of tars is relatively reduced since these gases contain almost no oxygen.

As it arises from the description of the invention, the latter also concerns a facility more simple than that of the above-described example. We compare in the following a facility of the invention for biomass preparation, including a Conturbex 520 type (commercial name) centrifuge which can treat up to 20 m³ of matter/h. The treated biomass has been shredded beforehand to a wood board size smaller than 63 mm in length with a thickness in the range of one centimeter and has a density of 200-300 kg/m³. Hence, this machine can treat from 4 to 6 t of biomass/h. The lignocellulosic biomass may be charged with 40 to 90% of water and we have determined that the aforementioned centrifuge allows an extraction down to a residual content of 30-40%. Hence, a supply of 5 t/h allows extracting between 0.5 and 2.5 t of water, depending on the initial water charge of the matter. The power of the Conturbex 520 is 22 kW/h, it will therefore effectively consume an average of 14.3 kW/h (a 0.65 factor between the rated value and the average) for an extraction capacity of 500 to 2000 l.

As a comparative example, considering 5 t/h of entering matter with 50 weight % of water, a minimum extraction of 10% namely 250 l, a Conturbex 520 will consume an average of 57.2 kW for each ton of evacuated water.

In general, the thermal processes allowing the drying consume between 1 and 1.5 mW for each ton of evaporated water. Hence, the energy consumption is reduced by a minimum factor of 17.5.

Similarly, a biomass treatment facility according to the invention including an attrition crusher is also distinguished by a reduced energy consumption for a desired drying, in comparison with the conventional thermal treatments. As example, an Atritor 18A type (commercial name) crusher allows refining the matter shredded beforehand as described hereinabove, to the desired granulometry (0.1 to 30 mm) in one single pass, with a yield of 24 t/h. The rated power of the Atritor 18A is 160 kW/h. In order to carry out the same operation by conventional crushing (hammers, flails, knives), a proposal retained for its interesting treatment capacity, power and price, uses two crushers in series each with a power of 370 kW/h, a yield of 18 t/h, which brings the average consumption to 26.7 kW for each refined ton. The Atritor 18A allows reaching the result with 4.3 kW/ton; the energy consumption is therefore reduced by a factor of 6.

For the concurrent drying operation in the Atritor, it has been observed a reduction of the water weight by 6 to 10% depending on the matters, by internal warm-up at atmospheric pressure, without any external heat supply. It has also been observed that with an external heat supply, the drying yield throughout the attrition crushing would allow obtaining an efficiency in the range of 0.75 MW/ton of evacuated water.

Actually, in the other crushers, we also observe a reduction of the water weight, but limited to 2-3%. The loss of water is 2 to 3 times greater in the aforementioned example. As regards drying by means of an external heat supply, the drying efficiency with the Atritor is 1.5 to 2 times greater than in the other technologies.

In the context of this comparison, it should be noted that the servicing of a crusher is generally heavy and requires regular interventions. Conversely, the attrition crusher, in particular the aforementioned Atritor crusher requires only but a light servicing at spaced time intervals. Furthermore, it allows working in a controlled atmosphere; which is rather barely realistic in the case of the conventional crushers other than the Atritor, though this embodiment may turn out to be particularly important in the context of the invention.

The invention claimed is:

1. A method for preparing a lignocellulosic biomass, the biomass being wood and residues of lignocellulosic cultures, and the biomass being admitted in the form of particles having a grain-size distribution of 3.15 to 16 mm, 8 to 31.5 mm, 8 to 45 mm, 8 to 63 mm, or 16 to 100 mm, the method comprising a method for water extraction, wherein the water extraction includes a centrifugation of the biomass followed by an attrition crushing-drying of the biomass and wherein biomass extracted from the attrition crusher-dryer has a particle dimension in the range of one millimeter to one centimeter.

2. The method according to claim 1, wherein the centrifugation is performed in a screen wringer rotating at a speed generating a centrifugal force greater than 1000 G.

3. The method according to claim 2, wherein the centrifugation is performed in a horizontal-axis screen wringer, continuously supplied with a flow of biomass at a small-diameter side, moisture-reduced biomass being recovered at a large-diameter side.

4. The method according to claim 3, further comprising conveying the biomass to the attrition crushing drying step using air at a temperature lower than 200° C.

5. The method according to claim 1, wherein the centrifugation reduces moisture content of the biomass by 8 to 20 weight %, so as to bring it to lower than 50 weight %.

6. The method according to claim 1, wherein the attrition crushing-drying reduces a size of the biomass particles admitted in the attrition crushing-drying step, and heat-soaks the biomass subsequent to exposure to heat generated by the crushing and the attrition, the crushing-drying being performed in an Attritor-type attrition crusher including a fixed flat drum supporting fixed crushing members on its two sidewalls and a disc rotating in said drum, thus defining a first cage and a second cage, and supporting movable crushing members, the disc rotating at speeds in the range of 500 to 2000 rpm, and the biomass being brought by a fluid flow, in proximity to an axis of rotation of the disc, into the first cage, coarsely crushed in the first cage and conveyed toward a periphery of the drum so as to circumvent the disc and pass into the second cage, before being finally expelled from the second cage by a fluid flow in proximity to an axis of rotation of the disc through a filtering diaphragm.

7. The method according to claim 1, wherein the attrition crushing-drying reduces the moisture content of the biomass by 8 to 30 weight %.

8. The method according to claim 1, wherein the method further includes between the centrifugation and the attrition crushing-drying, an intermediate drying step using a hot gas at a temperature lower than 200° C.

9. The method according to claim 8, wherein the intermediate drying step at a low temperature reduces the moisture content by 10 to 15 weight %.

10. The method according to claim 1, wherein the method further includes a supplemental drying step by a hot gas at a temperature of lower than 200° C.

11. The method according to claim 1, wherein the method further includes a roasting or carbonization step, or a step of forming or manufacturing building materials.

12. A facility for preparing a lignocellulosic biomass comprising wood and residues of lignocellulosic cultures, and the biomass being in the form of particles having a grain-size distribution of 3.15 to 16 mm, 8 to 31.5 mm, 8 to 45 mm, 8 to 63 mm, or 16 to 100 mm, the facility including at least one shredding device and one screen centrifuge followed by an attrition crusher-dryer, wherein the biomass extracted from the attrition crusher-dryer has a particle dimension in the range of one millimeter to one centimeter, and wherein the facility further includes, between the screen centrifuge and the attrition crushing dryer, a drying apparatus which uses a hot gas at a temperature lower than 200° C.

13. The facility according to claim 12, wherein the screen centrifuge rotates at a rotational speed generating a centrifugal force of at least 1000 G.

14. The facility according to claim 13, wherein the screen centrifuge includes a horizontal-axis trunconical sieve, continuously supplied with a flow of biomass at a small-diameter side, the moisture-reduced biomass being recovered at a large-diameter side.

15. The facility according to claim 12, wherein the biomass is conveyed to the facility by a gas stream at a temperature lower than 200° C.

16. The facility according to claim 12, wherein the attrition crusher-dryer is an Attritor-type crusher-dryer including a fixed flat drum supporting fixed crushing members on its two sidewalls, a disc rotating in said drum, thus defining a first cage and a second cage, and supporting movable crushing members, the disc rotating at speeds in the range of 500 to 2000 rpm, and a conduit for supplying biomass in suspension in a gas stream, in proximity to an axis of rotation of the disc, into the first cage, and a conduit for discharging the matter in suspension in a gas stream, from the second cage in proximity to an axis of rotation of the disc.

17. The facility according to claim 12, wherein the facility further includes, downstream of the attrition crusher-dryer, a supplemental drying apparatus using a hot gas at a temperature of lower than 200° C.

\* \* \* \* \*